No. 872,803. PATENTED DEC. 3, 1907.
R. H. ELKINS.
DISTRIBUTER FOR FORCE FEED LUBRICATORS.
APPLICATION FILED NOV. 15, 1906.
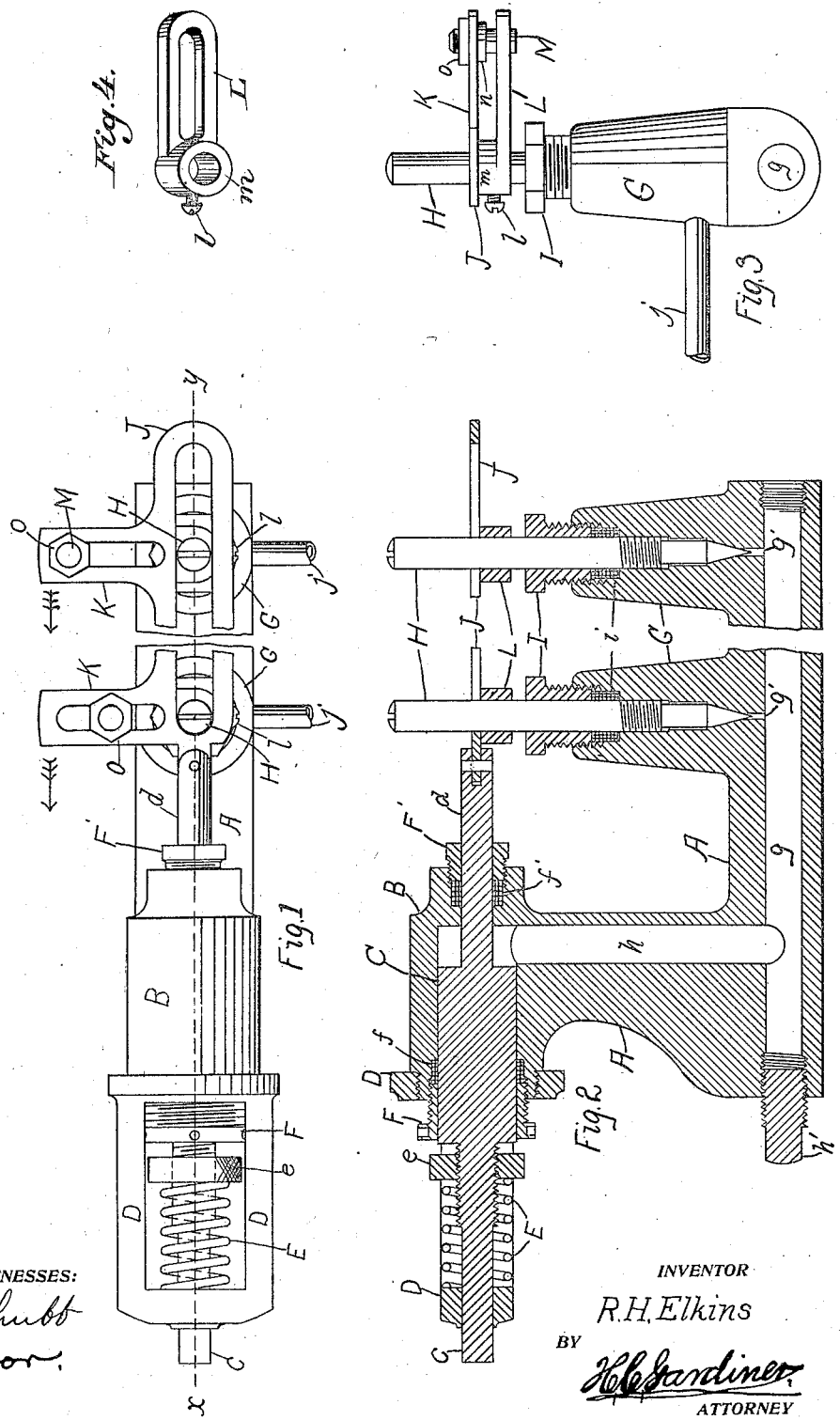
WITNESSES:
INVENTOR
R.H. Elkins
BY
ATTORNEY

UNITED STATES PATENT OFFICE.

ROLAND H. ELKINS, OF SIOUX CITY, IOWA.

DISTRIBUTER FOR FORCE-FEED LUBRICATORS.

No. 872,803.     Specification of Letters Patent.     Patented Dec. 3, 1907.

Application filed November 15, 1906. Serial No. 343,648.

*To all whom it may concern:*

Be it known that I, ROLAND H. ELKINS, a citizen of the United States, residing at Sioux City, in the county of Woodbury and State of Iowa, have invented new and useful Improvements in Distributers for Force-Feed Lubricators, of which the following is a specification.

My invention relates to the distribution of oil in the lubrication of machinery when applied by force feed lubricators.

The invention is designed as an improvement upon my distributer for force feed lubricators for which Letters Patent were issued on November 20th 1906, Number 836,308.

The object as in the former invention is the distribution automatically of oil in fixed ratios and against different pressures without the use of separate lubricators or pumps.

It is especially adapted for automobiles and locomotives, and, in fact, to all kinds of machinery having many separate parts for lubrication. The lubricant is furnished to the different parts through pipes leading from the distributer and the quantity of lubricant for all the parts is determined by that fed from the lubricator or pump. The ratio for each part is determined by the area of the opening from which the oil is discharged from the distributer.

Reference is now had to the accompanying drawing forming a part of this specification in which Figure 1 is a plan view of my invention and Fig. 2 is a cross-section on line $x$—$y$, Fig. 1, the vertical plugs being shown in full. Fig. 3 is a detail view showing in end elevation the last of the series of vertical shells through which the lubricant is distributed with the pipe and lever attached. Fig. 4 is a perspective view of lever showing the slot therein.

Referring to the illustration, A is the frame supporting a round, horizontal shell B, in which operates a central plug C having at its ends the stems $c$ and $d$.

To the outer end of the shell is screwed a yoke D through which the end of the stem, $c$, freely passes. Near the shoulder of the plug the stem is threaded and is encircled by a knurled nut $e$. Between the nut and the outer end of the yoke a spring E encircles the stem and sustains the pressure of oil from the lubricator. The tension of the spring may be regulated by adjusting the nut $e$. Packing glands F and F' and packing $f$, $f'$ around the outer ends of the plug prevent leakage of oil from the shell. The oil enters the shell through the pipe $g$, which is connected with the lubricator or pump, and the pipe $h$, both being located in the frame A. Either end of the pipe $g$ may be connected with the lubricator, the end not in use being stopped by a plug $h'$. Above the pipe $g$ and formed integral with the frame, are a series of vertical shells G, G, communicating with the pipe $g$, through the pipes $g'$, $g'$ leading to the interior of the shells. As many vertical shells may be provided as there are separate parts of the machine to be lubricated, the pipes $j$, $j$, conveying the oil to the various parts. In each vertical shell is a taper plug H which is threaded near the lower end and screwed into the interior of the shell which is also threaded to receive the plug as shown in Fig. 2. The plug is smaller below the thread and tapers at the end, and the interior of the shell is slightly larger and of corresponding shape. Packing glands I, I, and packing $i$, $i$, surround the plugs in the upper ends of the shells and prevent leakage.

To the outer end of the stem of the plug C is secured a bar J having a central slot which incloses the stems or upper ends of the vertical plugs H, H. The bar is provided with arms, K, K, formed at right angles to the bar and integral with it, each arm also having a central slot normally situated directly opposite the plug stems. Directly underneath said arms are arms L having correspondingly central slots, and in one end an annular opening in which are fitted the stems or upper ends of the plugs H. The arms L are secured to the stems by means of the screws $l$. At the ends inclosing the plugs the arms have lugs or shoulders $m$, to provide a space between them and the arms K. Each set or pair of arms is connected by bolts M having central heads $n$, and nuts $o$ at the upper ends. These bolts may be adjusted at any place in the slots by means of the nuts. The arms K and L thus form levers for turning the vertical plugs in the screws in the interior of the respective shells, thus raising the point of the plugs out of their seats in the pipes $g'$ and permitting the oil to enter the interior of the shell.

As the oil is forced from the lubricator or pump through the pipes $g$ and $h$ into the shell B, it crowds the plug C toward the spring, pulling the stem $d$ and bar J in the same direction. The movement communicated by the arms K and L to the plugs H, turns the plugs in the screws and raises them from their seats. The distance each plug is raised depends upon the position of the bolt connecting the arms. Thus, if the bolt is adjusted at the outer end of the slot the lever is longer and the plug is not turned so far in the screw as if adjusted at the inner end, and consequently the plug is only slightly raised. When the bolt is at the inner end of the slot the plug is turned farther and raised to the full capacity of the lever. The quantity of oil required to pass through any outlet pipe to the machinery may be regulated by this adjustment of the bolts. The oil entering the vertical shells passes out through the pipes $j$ to the machinery to be lubricated. As many shells as required may be provided. The ratio of discharge through the different pipes is automatically maintained by the tension of the spring at the operating plug. The tension of the spring must always be strong enough to overcome the greatest pressure from any part of the machinery, and must be overcome by the force of the lubricator or pump before any oil will pass out of the distributer.

Having described my invention what I claim as new and desire to secure by Letters Patent is:

1. In an oil distributer, an outer shell having communication with the supply main of a lubricator, a plug therein against which the lubricant presses, a spring to sustain the pressure of the lubricant, pipes leading from the supply main to the machinery to be lubricated, means for closing said pipes and means operated by said plug for opening the same, substantially as described.

2. In an oil distributer, an outer shell having communication with the supply main of a lubricator, an operating plug therein against which the lubricant presses, a spring to sustain the pressure of the lubricant, shells leading from the lubricator into which the lubricant passes, plugs seated in the said shells to arrest the flow of the lubricant, levers connecting said plugs with the operating plug for opening and closing the same, and pipes leading from the shells to the machinery to be lubricated, substantially as described.

3. An oil distributer consisting of an outer shell having communication with the supply main of a lubricator, an operating plug therein against which the lubricant presses, a spring on said plug to sustain the pressure of the lubricant, shells connected with the supply main into which the lubricant passes, plugs screwed into the interior of the shells to arrest the flow of the lubricant, a lever connecting said plugs with the operating plug for turning said plugs and regulating the openings in said shells, and pipes leading from the shells to the machinery to be lubricated, substantially as descibed.

4. An oil distributer consisting of an outer shell leading from the supply main of a lubricator, an operating plug therein against which the lubricant presses, a spring on said plug to sustain the pressure of the lubricant, shells having direct communication with the lubricator, plugs screwed into the interior of the said shells to arrest the flow of the lubricant, levers secured to said operating plugs and attached to said plugs for turning them in their seats, means for adjusting the length of said levers for regulating the extent to which said plugs are turned, and pipes leading from the shells to the machinery, substantially as described.

5. An oil distributer consisting of an outer shell leading from the supply main of a lubricator, an operating plug therein against which the lubricant presses, a spring on said plug to sustain the pressure of the lubricant, shells having communication with the lubricator, plugs screwed into the interior of the said shells to arrest the flow of the lubricant, a bar having a central slot inclosing the stems of said plugs and secured to the operating plug, arms secured at right angles to said bar and having central slots therein, arms secured to said plugs underneath said first arms and having correspondingly central slots therein, bolts for adjustment in said slots to secure said arms together, and pipes leading from the shells to the machinery to be lubricated, substantially as described.

In testimony whereof I have signed my name to this specification in the presence of two subscribing witnesses.

ROLAND H. ELKINS.

Witnesses:
H. C. GARDINER,
J. M. SNOEN.